United States Patent
Smith et al.

(10) Patent No.: US 8,325,217 B2
(45) Date of Patent: Dec. 4, 2012

(54) SENDING VIDEO DATA OVER A NETWORK

(75) Inventors: Matthew David Smith, Corvallis, OR (US); Douglas A. Pederson, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1618 days.

(21) Appl. No.: 11/799,384

(22) Filed: Apr. 30, 2007

(65) Prior Publication Data

US 2008/0267283 A1 Oct. 30, 2008

(51) Int. Cl.
*H04N 7/14* (2006.01)

(52) U.S. Cl. .............. 348/14.13; 348/14.05; 348/14.14; 370/259; 709/201; 725/135

(58) Field of Classification Search .... 348/14.01–14.16; 370/259–271, 351–356; 709/201–207, 217–248
See application file for complete search history.

(56) References Cited

U.S. PATENT DOCUMENTS

| | | | |
|---|---|---|---|
| 6,009,228 A * | 12/1999 | Fujita et al. | 386/281 |
| 6,154,600 A * | 11/2000 | Newman et al. | 386/281 |
| 6,476,826 B1 * | 11/2002 | Plotkin et al. | 715/723 |
| 6,747,707 B2 * | 6/2004 | Saito et al. | 348/722 |
| 7,007,235 B1 * | 2/2006 | Hussein et al. | 715/751 |
| 2003/0225641 A1 * | 12/2003 | Gritzmacher et al. | 705/34 |
| 2004/0080611 A1 * | 4/2004 | Kakii et al. | 348/14.16 |
| 2004/0128354 A1 * | 7/2004 | Horikiri et al. | 709/204 |
| 2004/0233337 A1 * | 11/2004 | Yamauchi et al. | 348/722 |
| 2005/0010874 A1 * | 1/2005 | Moder et al. | 715/751 |
| 2006/0204226 A1 | 9/2006 | Park et al. | |
| 2006/0294467 A1 * | 12/2006 | Auterinen | 715/723 |
| 2007/0250863 A1 * | 10/2007 | Ferguson | 725/46 |

* cited by examiner

*Primary Examiner* — Hemant Patel

(57) ABSTRACT

A method of sending video data over a network is disclosed. The method includes initiating a video data stream between a first site and a second site over the network, sending compressed video content from the first site to the second site, decompressing the video content at the first site, decompressing the video content at the second site and synchronizing the decompressed video content at the first and second site whereby the video data stream can be controlled by either the first or second site.

15 Claims, 4 Drawing Sheets

SENDING VIDEO DATA OVER A NETWORK

BACKGROUND

In the film industry, companies work collaboratively on video clips for editing purposes. This is sometimes done in a video conference environment. In a video conference environment for performing an electronic conference through a communication network, a video conference system is provided in each of locations in which participants of a conference come together and a plurality of such video conference systems communicate via the communication network. Each video conference system collects image information and audio information in a location in which the conference system is provided. The image information and the audio information are synthesized and the synthesized information is distributed to the respective conference systems. In each conference system, the image information is displayed on a display device provided in the video conference system and the audio information is outputted through a loudspeaker also provided in the video conference system.

In the video conference environment, if individuals at different video conferencing systems wanted to watch a saved video clip together to edit/critique it, one site would have to send it to another site. This process involves multiple encode/decode steps which could lead to video quality degradation. Furthermore, the synchronization of the collaborative effort is problematic because each site only has control of the video clip that is running on it's respective system and none of the other systems.

DETAILED DESCRIPTION

Figure 1:
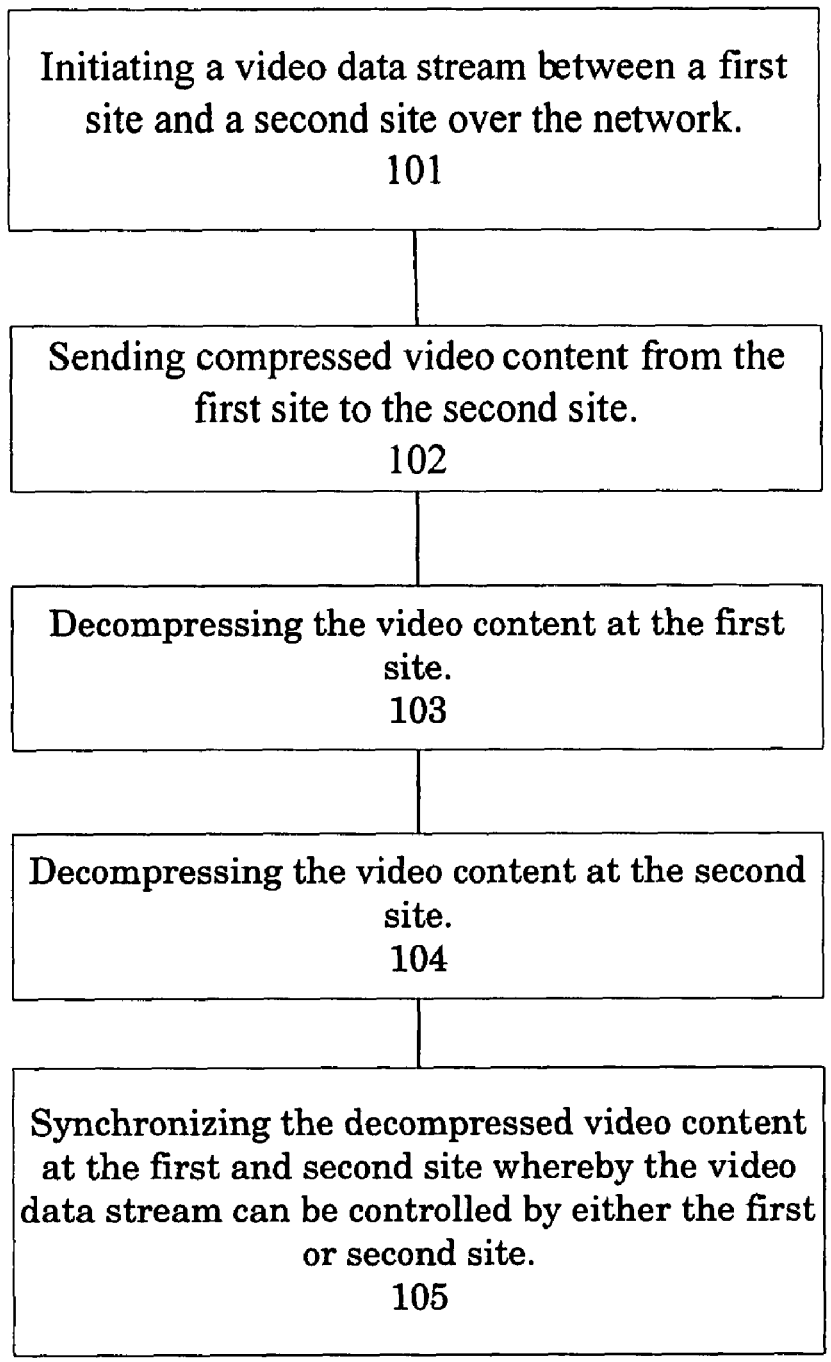
FIG. 1 is a high-level flowchart of a method in accordance with an embodiment.

As shown in the drawings for purposes of illustration, a method of sending video data over a network is disclosed. The method allows for video content to be streamed from a first location to a second location in a direct fashion thereby bypassing the decode/encode process. The video content can be controlled at either location. By implementing this method, unnecessary encoding and decoding is avoided thereby minimizing the chance for video quality degradation, and also reducing decode/encode delays. Also, collaborative analysis of video content can by accomplished in a video conference environment in a more convenient fashion.

FIG. 1 is a flowchart of a method in accordance with an embodiment. A first step 101 involves initiating a video data stream between a first site and a second site over the network. A second step 102 includes sending compressed video content from the first site to the second site. A third step 103 includes decompressing the video content at the first site. A fourth step 104 includes decompressing the video content at the second site. A final step 105 includes synchronizing the decompressed video content at the first and second site whereby the video data stream can be controlled by either the first or second site. Again, by implementing this feature, unnecessary encoding and decoding is avoided.

Figure 2:
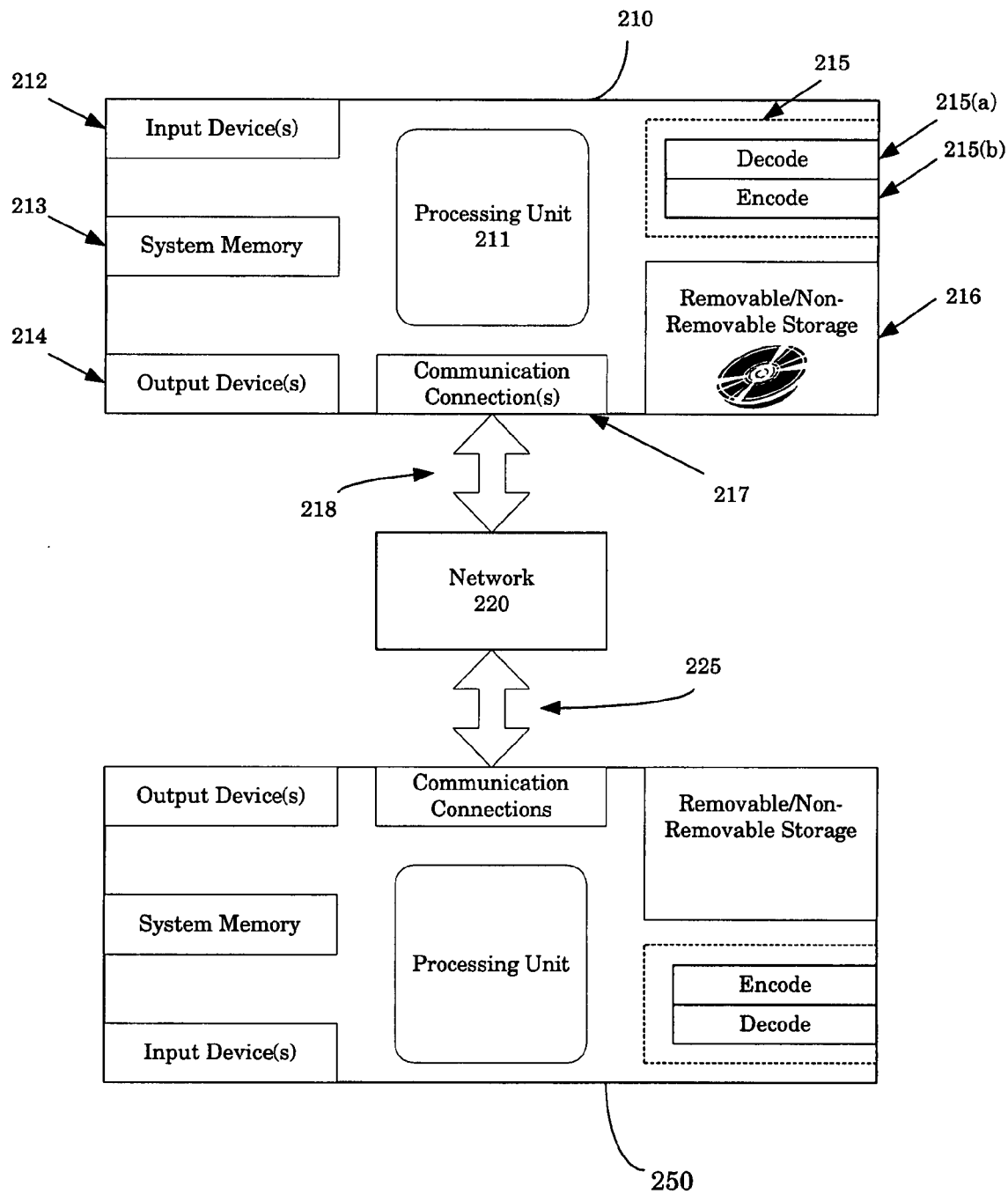
FIG. 2 is an exemplary video conference environment in accordance with an embodiment.

Referring to FIG. 2, an exemplary video conference environment 200 is illustrated. The environment 200 includes multiple video conference systems 210 and 250 associated with multiple sites of the video conference. The respective video conference systems 210 (first site) and 250 (second site) are located in different points in the environment 200 and send image and voice data to participants of a video conference through the bi-directional digital transmission paths 218 and 225 and simultaneously receive image and voice data of other video conference units and display the images and output the voices thereof via network 220.

In an embodiment, the network 220 is a system that transmits any combination of voice, video and/or data between users. A network typically includes a network operating system, one or more computer systems, the cables connecting them and all supporting hardware and software in between such as bridges, routers and switches. The network operating system manages the different aspects of the network and makes it possible for the network components to transmit data therebetween.

Although the environment of 200 is disclosed in conjunction with two video conference systems, one of ordinary skill in the art will readily recognize that more than two systems could be employed while remaining within the spirit and scope of the present inventive concepts.

With reference to FIG. 2, system 210 is now described. Since system 250 has the same construction as that of system 210, respectively, only the system 210 need be described. In its most basic configuration, system 210 typically includes at least one processing unit 211 and memory 213. System 210 also includes a video processing unit 215 and a data storage medium 216. Computer storage media includes but is not limited to, RAM, ROM, EEPROM, flash memory or other memory technology, CD-ROM, digital versatile disks (DVD) or other optical storage, or any other medium which can be used to store the desired information and which can be accessed.

System 210 may also contain communications connection(s) 217 that allow the system to communicate with other devices. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media.

System 210 may also have input device(s) 212 such as keyboard, mouse, voice input device, touch input device, etc. Output device(s) 214 such as a display, speakers, printer, etc. may also be included. All these devices are well known in the art and need not be discussed at length here.

System 210 also includes a video processing component 215 for transmitting video data. The video processing component 215 includes an encoder 215(a) and a decoder 215(b). Typically, in order to send video data (MPEG2, etc.) over a network or to store it on a storage medium, the data is "encoded" or "compressed" since the "raw" or "uncompressed" video data is to large to be feasibly transmitted over the network or store onto a storage medium. Encoding audio/video data significantly reduces the size of the data but also affects the quality of the video data. Decoding audio/video data involves "decompressing" the encoded data and thereby converting it into data that can be viewed or processed.

Figure 3:
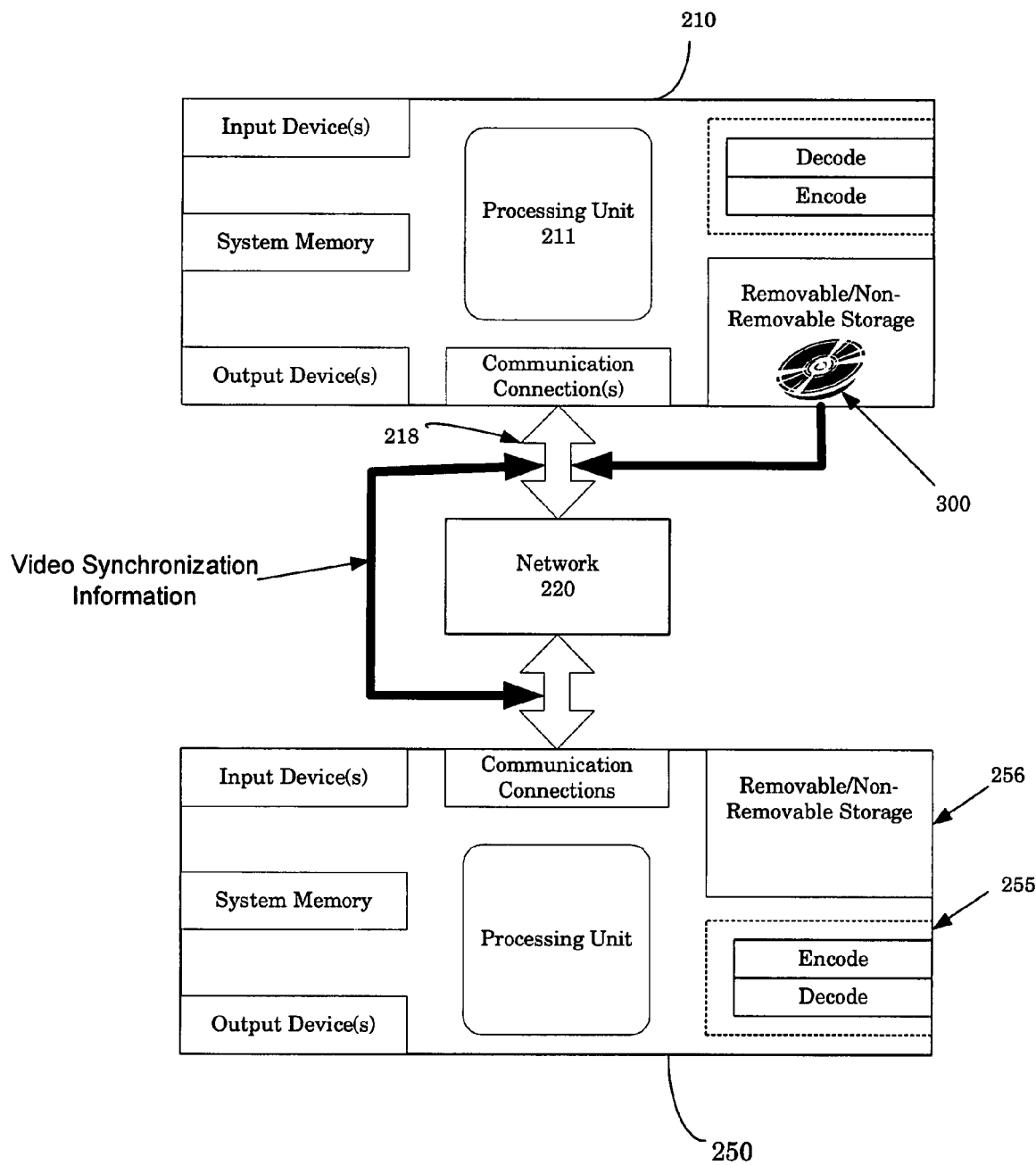
FIG. 3 shows is an illustration of a system in accordance with an alternate embodiment.

In an embodiment, the video conference environment 200 allows for video content to be sent directly over the network 220. Accordingly, the video content is streamed from a first site to a second site in a direct fashion thereby bypassing the outgoing decode/encode process. FIG. 3 is an illustration of this sequence. FIG. 3 shows the first site 210, the network 220 and a second site 250. For exemplary purposes, the first site 210 also includes a compressed video data source 300 such as a DVD or the like. In an embodiment, the video data source 300 is stored in the data storage medium 216.

The second site 250 includes a storage device 256 and video processing component 255. Accordingly, data from the compressed video data source 300 is packetized and sent directly from the first site 210 via transmission path 218, bypassing any outgoing encode/decode process, to the second site 250 over the network 220.

In an embodiment, the compressed video data is sent in a streaming fashion. Streaming refers to watching the video data at the second site while it is being transferred by the first site. This is accomplished through the implementation of some type of digital buffering system at the second site. Alternatively, the data can be de-packetized and stored on the data storage device 256. Video synchronization information is then exchanged between the first site 210 and the second site 250 thereby enabling either the first site 220 or the second site 250 to control (pause, fast forward, etc.) the video data regardless of which site is issuing commands and regardless of network latency.

Video synchronization can be implemented in a variety of ways. For example, the synchronization can be implemented on a frame-by-frame basis ("frame-by-frame" mode) whereby the video stream is synchronized to be viewed at each site one frame at a time, where all sites would see each frame simultaneously. Also, the synchronization can be implemented on a timing basis ("time" mode) whereby the video stream is synchronized to be viewed at each site at a similar time (e.g. within ¼ second) which would be due solely to the network latency (transit time) from the first site to the other site(s). Alternatively, the system can be configured to switch between modes, whereby a user can selectively switch between the frame-by-frame mode and time mode while viewing the video data.

Figure 4:
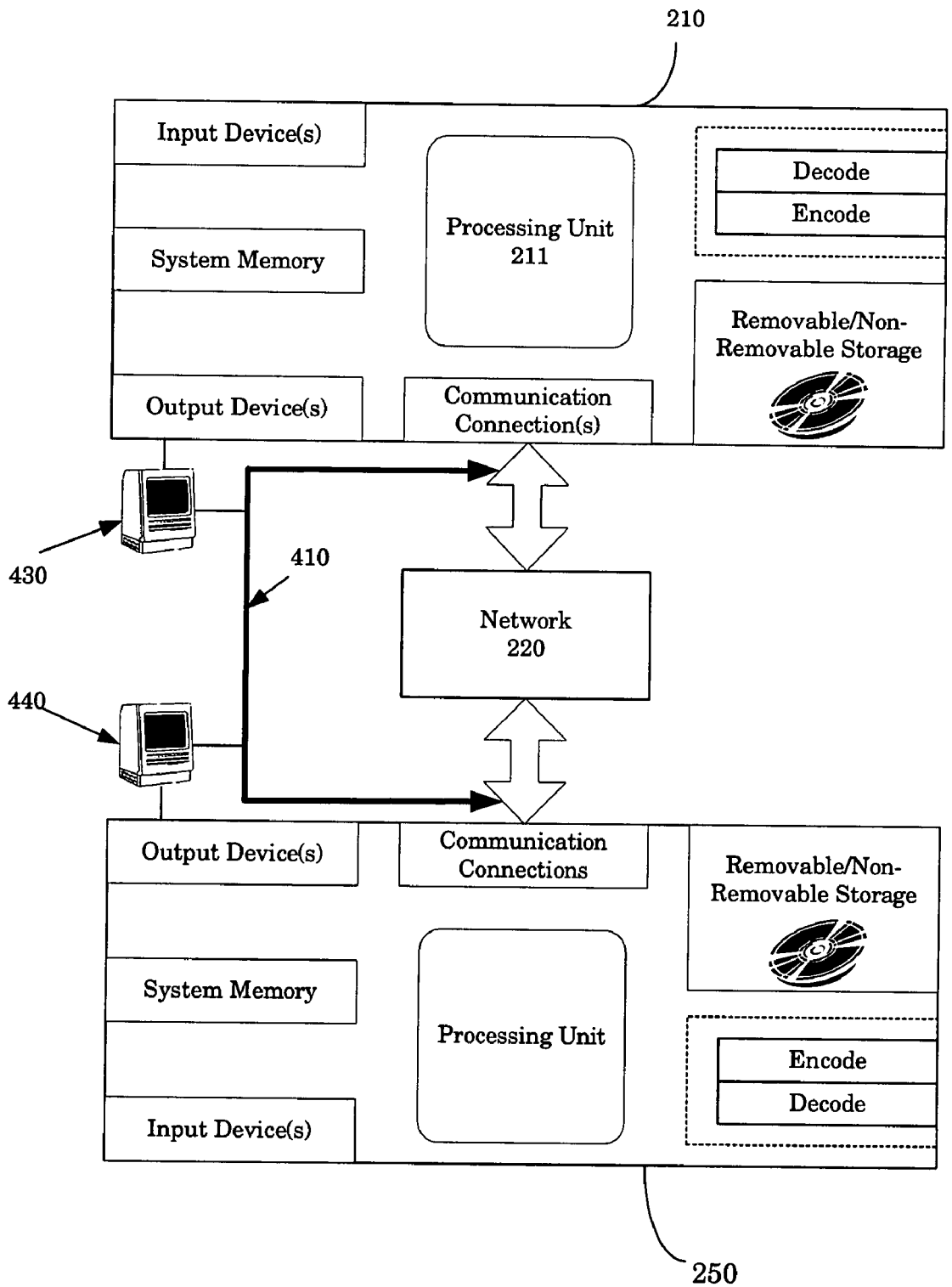
FIG. 4 is an illustration of a system in accordance with another alternate embodiment.

In an embodiment, a collaboration channel could also be employed in conjunction with the above-delineated sequence. The collaboration channel could be used for editing, controlling and displaying the video. FIG. 4 is an illustration of this embodiment. FIG. 4 shows the first site 210, the network 220 and a second site 250. Also shown, is a collaboration channel 410 wherein the collaboration channel 410 is configured to communicate with a first display 430 associated with the first site 210 and a second display 440 associated with the second site 250. Accordingly, once the video synchronization information has been exchanged between the first site 210 and the second site 250, the collaboration channel 410 could be used for editing, controlling and displaying the video data.

A method of sending audio/video (AV) data over a network is disclosed. The method includes initiating a AV data stream between a first site and a second site over the network, sending compressed AV content from the first site to the second site, decompressing the AV content at the first site, decompressing the AV content at the second site and synchronizing the decompressed AV content at the first and second site whereby the AV data stream can be controlled by either the first or second site. By implementing this method, unnecessary encoding/decoding is avoided thereby minimizing the chance for audio/video quality degradation. Furthermore, collaborative analysis of video content can by accomplished in a more convenient fashion.

The above-described embodiment may also be implemented, for example, by operating a computer system to execute a sequence of computer readable instructions. Accordingly, a computing device typically includes at least some form of computer readable media. Computer readable media can be any available media that can be accessed by computing device. By way of example, and not limitation, computer readable media may comprise computer storage media and communications media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage device, or any other medium which can be used to store the desired information and which can be accessed by a computing device.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media. Accordingly, an alternate embodiment includes a computer readable medium having computer executable components for sending video data over a network.

Without further analysis, the foregoing so fully reveals the gist of the present inventive concepts that others can, by applying current knowledge, readily adapt it for various applications without omitting features that, from the standpoint of prior art, fairly constitute essential characteristics of the generic or specific aspects of this invention. Therefore, such applications should and are intended to be comprehended within the meaning and range of equivalents of the following claims. Although this invention has been described in terms of certain embodiments, other embodiments that are apparent to those of ordinary skill in the art are also within the scope of this invention, as defined in the claims that follow.

The invention claimed is:

1. A method of sending video data over a network comprising:
    initiating a video data stream between a first site and a second site over the network;
    sending compressed video content from a compressed video data source of the first site to the second site;
    decompressing the video content at the first site;
    decompressing the video content at the second site; and
    synchronizing viewing of the decompressed video content at the first and second site whereby the video data stream can be controlled by both the first site and the second site.

2. The method of claim 1 wherein synchronizing the decompressed video content occurs based on at least one of a frame-by-frame mode and a time mode.

3. The method of claim 2 wherein the time mode is synchronized based on a network latency.

4. The method of claim 1 wherein the video content is controlled via a collaboration channel by either the first or second site.

5. The method of claim 1 wherein the video content is displayed at the first and second site via a collaboration channel.

6. A computer program product for sending video data over a network, the computer program product comprising a non-transitory computer storage medium having computer readable program means for causing a computer to perform the steps of:
- initiating a video data stream between a first site and a second site over a network;
- sending compressed video content from a compressed video data source of the first site to the second site;
- decompressing the video content at the first site;
- decompressing the video content at the second site; and
- synchronizing viewing of the decompressed video content at the first and second site whereby the video data stream can be controlled by both the first site and the second site.

7. The computer program product of claim 6 wherein synchronizing the decompressed video content occurs based on at least one of a frame-by-frame mode and a time mode.

8. The computer program product of claim 7 wherein the time mode is synchronized based on a network latency.

9. The computer program product of claim 6 wherein the video content is controlled via a collaboration channel by either the first or second site.

10. The computer program product of claim 6 wherein the video content is displayed at the first and second site via a collaboration channel.

11. A video conference system comprising:
- a first site;
- a second site; and
- means for sending video data over a network whereby sending video data over the network comprises initiating a video data stream between a first site and a second site over the network, sending compressed video content from a compressed video data source of the first site to the second site, decompressing the video content at the first site, decompressing the video content at the second site and synchronizing viewing of the decompressed video content at the first and second site whereby the video data stream can be controlled by both the first site and the second site.

12. The video conference system of claim 11 wherein synchronizing the decompressed video content occurs based on at least one of a frame-by-frame mode and a time mode.

13. The video conference system of claim 12 wherein the time mode is synchronized based on a network latency.

14. The video conference system of claim 11 further comprising a collaboration channel wherein the video content is controlled via a collaboration channel by either the first or second site.

15. The video conference system of claim 14 further comprising wherein the video content is displayed at the first and second site via a collaboration channel.

* * * * *